United States Patent Office 3,817,717
Patented June 18, 1974

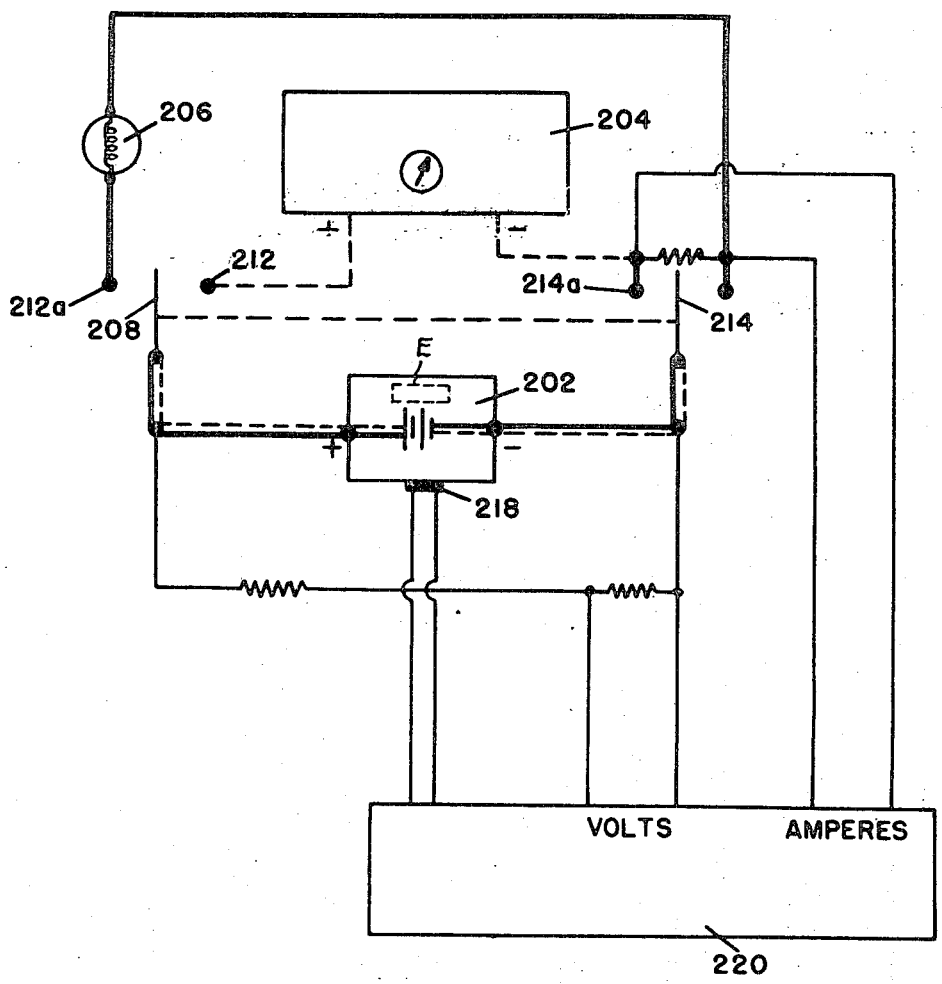

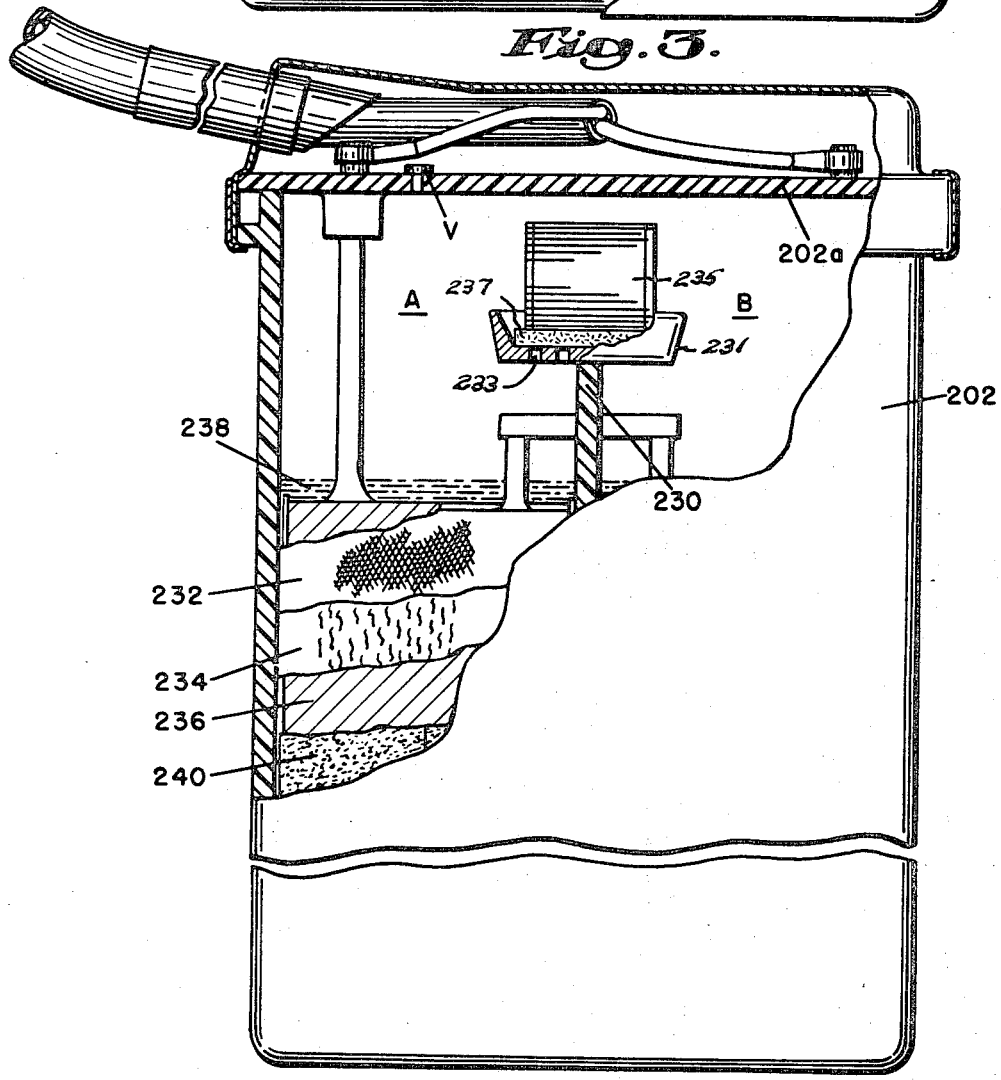

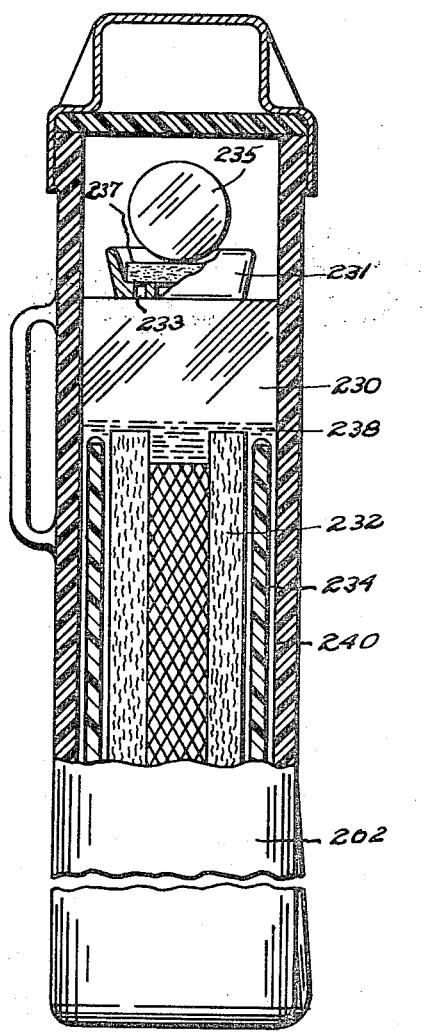

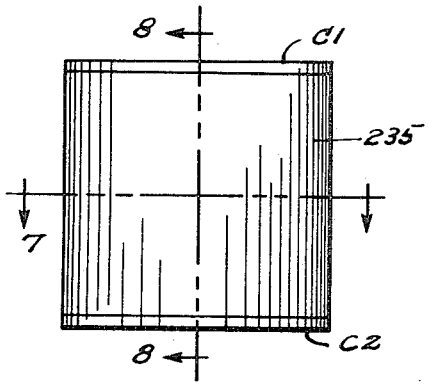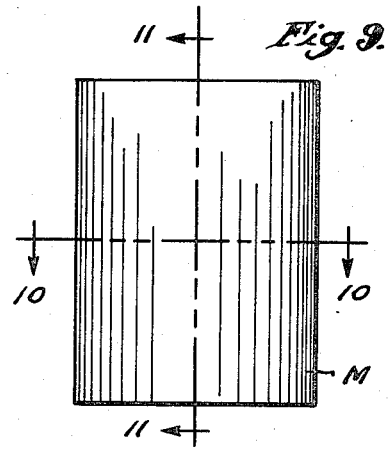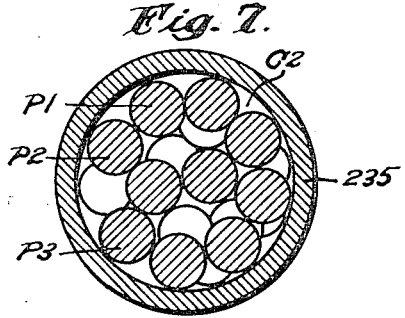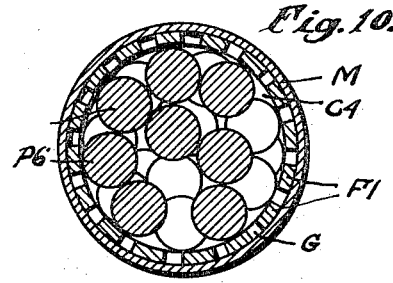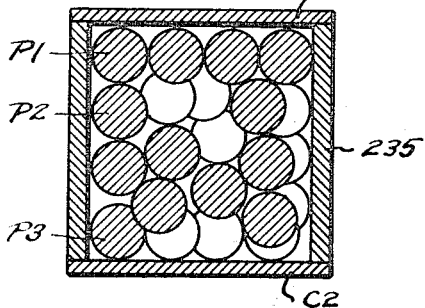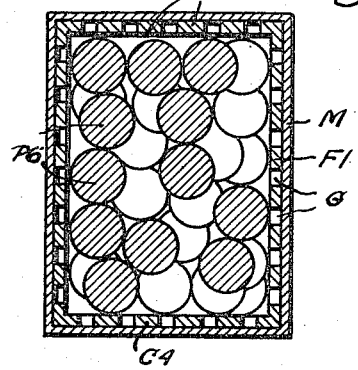

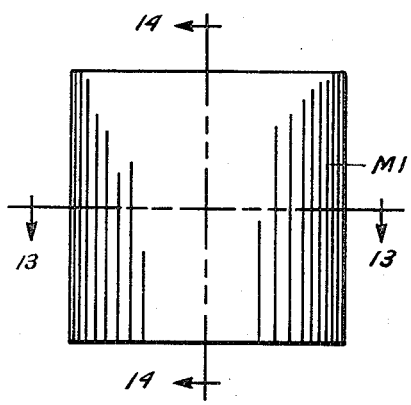
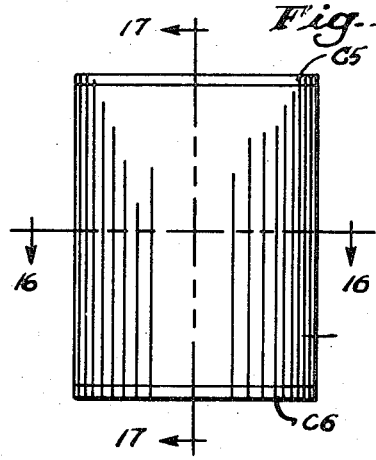
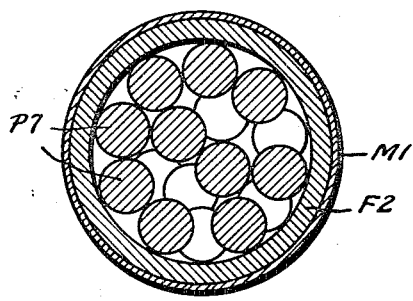
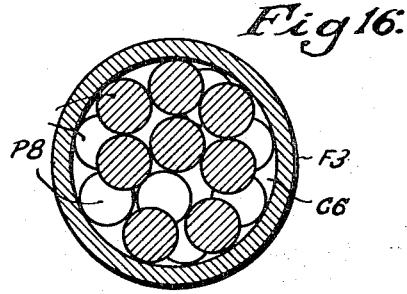
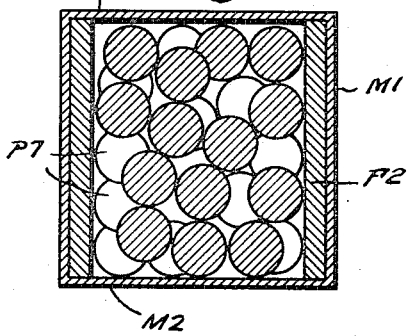
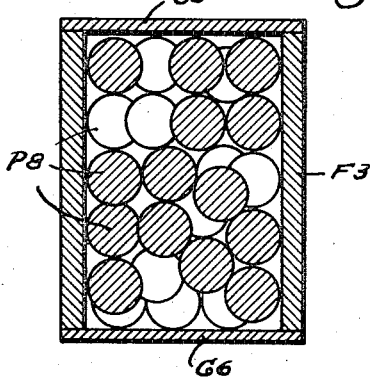

3,817,717
APPARATUS FOR RECOMBINING HYDROGEN AND OXYGEN AND PROTECTIVELY RETURNING WATER OF RECOMBINATION TO THE BATTERY ELECTROLYTE
Ekkehard L. Kreidl, Wayland, Mass., and Richard G. Acton, Prestbury, England, assignors to Koehler Manufacturing Company, Marlboro, Mass.
Original application Mar. 6, 1970, Ser. No. 17,070, now abandoned. Divided and this application Feb. 14, 1972, Ser. No. 226,041
Int. Cl. B01j 9/04; H01m 1/08, 35/00
U.S. Cl. 23—288 R    4 Claims

ABSTRACT OF THE DISCLOSURE

A hydrogen-oxygen recombining device for use in secondary batteries comprising a catalytic mass and an enclosure body having the catalytic mass totally enclosed therewithin. The catalytic mass includes a refractory substrate and a predetermined quantity of catalytic material distributed on the substrate. The enclosure body consists solely of plastic hydrophobic material and has a portion which is gas permeable. The hydrophobic material, including its permeable portion, prevents liquid and mist from battery electrolyte from entering said body and contaminating said catalytic mass. The permeable portion permits hydrogen and oxygen to enter said body and contact said catalytic mass. The permeable portion also permits water vapor formed by recombining the hydrogen and oxygen to diffuse from said body. The catalytic mass has a catalytic metal content equivalent to a palladium content of not more than .1% by weight of the substrate. The catalytic mass, when inducing an exothermic reaction to recombine the hydrogen and oxygen, being characterized by a limited temperature rise within limits below that temperature at which hydrophobicity and permeability of the enclosure body would be changed.

---

This application is a divisional application of Ser. No. 17,070, filed Mar. 6, 1970, and now abandoned.

This invention relates to improved methods and means for reacting gases such as hydrogen and oxygen in the presence of a catalytic device. More particularly the invention is concerned with methods and means for operating and periodically recharging a secondary battery system throughout a number of battery charging and discharging cycles while recombining evolved hydrogen and oxygen gases in the presence of a special catalytic device which selectively receives the hydrogen and oxygen gases to form water vapor and which transfers the water vapor back to the battery electrolyte in a novel manner.

In recombining hydrogen and oxygen gases evolved during operation of a secondary battery by means of catalyst surfaces so that water vapor may be formed and returned as liquid water to the electrolyte, various difficulties are encountered. This is especially the case when dealing with a sealed secondary battery. For example, it is essential to deal with the problem of resolving excessive gas pressures and maintaining the catalytic device below temperatures which will result in ignition and explosion of the gases. For a more detailed discussion of difficulties, reference may be had to co-pending applications, Ser. No. 866,531, now issued as Pat. No. 3,630,778, dated Dec. 28, 1971, and Ser. No. 866,633, now abandoned, both of Oct. 15, 1969, and in these applications there are disclosed improved techniques for controlling temperatures at catalyst surfaces and regulating the rates at which recombination may proceed within safe limits.

A further difficulty which develops in recombining gases with a catalyst is the tendency for water vapor to condense and accumulate on the catalytic surfaces in excessive amounts such as will flood the catalyst. If undesirable amounts of water do accumulate, the excessively water-laden catalyst surfaces may become de-activated and will thereafter fail to recombine the hydrogen and oxygen gases properly. This problem of water accumulation is complicated by the fact that the catalyst surfaces must be protected from the chemical action of electrolyte spray such as sulfuric acid in lead batteries or potassium hydroxide in nickel iron batteries, and this involves using an enclosure body of some type. Where such an enclosure body is used, it too may become excessively water-laden. In such a situation, the water vapor formed by recombination of gases may be released outwardly through the enclosure body very sluggishly and movement of uncombined gases inwardly through the enclosure into contact with the catalytic surfaces may be undesirably restricted. Thus after a period of time, either the gases may fail to reach the catalyst surfaces properly or the catalyst surfaces may become de-activated.

It is, therefore, in general, an object of the invention to deal with the problems indicated and to devise a catalytic enclosure technique which is capable of transporting without interference and independently from each other (a) gases such as hydrogen and oxygen as they are evolved from a battery electrolyte during battery charging and discharging operations, and (b) water vapor resulting from recombination of stoichiometric quantities of gases such as hydrogen and oxygen in the presence of a catalyst, while (c) substantially rejecting mist or spray resulting from ebullition in a battery electrolyte as the hydrogen and oxygen gases are given off.

A further objective is to provide a selective gas transferral system by means of which gases such as hydrogen and oxygen may be continuously moved inwardly to catalyst surfaces while electrolyte mist or spray is substantially excluded and yet water vapor resulting from recombination of the gases within the transferral system may be expelled concurrently with inward travel of the gases. In other words, the passages selectively distinguish between true vapors and fine electrolyte mist.

It is another specific object of the invention to provide an improved method and means for operating a secondary battery, in particular a sealed secondary battery, in which method water vapor resulting from recombination of hydrogen and oxygen in the presence of a protectively contained catalyst may be continuously removed and prevented from accumulating on the reactive surfaces of the catalyst.

Another object is to provide a combination of catalyst means and a selective gas transferral system in which water vapor resulting from recombination of hydrogen and oxygen gases may be expelled without significant change in the gas permeability characteristics of the system.

Still another object of the invention is to devise a catalytic device which includes a catalyst and a special enclosure body formed with hydrophobic gas transferring means including gas inlets and water vapor outlets for not only conducting gases inwardly, but also for continuously travelling water vapor outwardly from the catalyst to be returned to the electrolyte as liquid water.

Still another object of the invention is to combine catalyst means with a selective transferral system which defines a small enclosure volume into which hydrogen and oxygen gases may be moved in response to partial gas pressure of these gases in a relatively larger surrounding volume.

And still another object is to devise a method of the class described in which exothermically induced rise in temperature within a catalytic device is controlled to prevent change in hydrophobic characteristics of an enclosure body component of the catalytic device while returning water of recombination to electrolyte.

With the foregoing objectives in mind and having regard especially for the difficulties arising out of excessive water accumulation on catalyst surfaces and electrolyte attack, we have approached the problem from the standpoint of seeking to provide a selective gas transferral technique by means of which hydrogen and oxygen gases may continuously come into contact with catalytic surfaces concurrently with outward travel of water vapor resulting from recombination of the gases on catalyst surfaces, and with electrolyte spray or mist being excluded from coming into contact with catalyst surfaces at all times.

A concept for a catalytic enclosure technique which distinguishes between gases, water vapor and electrolyte mist has evolved from a study of certain conditions and characteristics inherent in a secondary battery and its operation, and particularly a sealed secondary battery. Due to overvoltages, hydrogen and oxygen gas are usually evolved at the battery electrodes, particularly during the charge cycle. The transport mechanism of hydrogen and oxygen from the electrodes, at which they are formed, to an enclosure for the catalysts is of importance to the above concept. Initially the gases coalesce into bubbles in the electrolyte and when reaching its surface burst and generate electrolyte mist. The gases released to the gas space above the electrolyte tend to diffuse so as to equalize their partial pressure in the available space. However, in the presence of reactable gas mixtures of hydrogen and oxygen and of an active catalyst combining them to form water, the diffusion equilibrium is continuously disturbed by depletion of hydrogen and oxygen at the catalyst surface. This provides then a driving force for continued transport of reactable gases to the catalysts. This driving force in the following description is referred to as the partial gas pressure equalization force. Partial gas pressure is by definition that pressure an individual gas would exert in a given volume if other gases were absent. If only one gas is present, partial and absolute gas pressures are identical. It also should be noted that water vapor formed at the catalyst surface within the enclosure will, by the same mechanism, tend to diffuse towards the gas space to egualize its partial pressure over the entire gas space as determined by eventual return of the water to the electrolyte. This diffusion, however, is reinforced by the thermal drive, discussed elsewhere.

Secondly, the battery electrolyte from which gases are evolved is usually a relatively concentrated aqueous solution of an acid or an alkali and thus tends to be repelled by hydrophobic substances. Thirdly, the reaction of hydrogen and oxygen in the presence of a catalyst is an exothermic reaction producing water vapor and appreciable heat. Fourthly, water vapor resulting from evolving hydrogen and oxygen must not be condensed within the enclosure body but rather on the electrolyte surface or any of the surfaces occurring externally of the enclosure body.

With these conditions in mind, we have devised an improved method of gas recombination and return of water of recombination to an electrolyte based on a novel selective gas transferral technique. This selective gas transferral technique proceeds from our having determined that certain hydrophobic materials which can repel aqueous electrolyte materials may, at the same time, serve as a medium for transmitting gases and water vapor. In addition, the transferral technique makes use of the partial gas pressures generated in a battery during operation, and further utilizes the heat resulting from the exothermic reaction when water vapor is formed to transport the water vapor out of the enclosure body.

In carrying out our improved method of gas recombination, we provide a catalytic device which preferably includes a bed of catalyst surfaces contained in a specially designed enclosure body. An essential feature of this enclosure body is that it includes a specific form of hydrophobic material which is characterized by being resistant to electrolyte mist or spray and by an especially controlled permeability to thereby constitute a gas transfer means which provides gas inlets and preferably also water vapor outlets. The gas inlets are comprised by small openings or preferably pores which, while being capable of substantially excluding electrolyte mist or spray, are nevertheless permeable by hydrogen and oxygen in response to partial gas pressure equalization forces generated in the volume of a battery surrounding the catalytic device.

The size of the enclosure body containing the catalyst will be determined by the amount and shape of individual catalysts used. So as to take full advantage of the thermal drive, as described below, for removal of water vapor the catalyst should be uniformly distributed within the enclosure body so that the exothermic reaction of water formation heats the enclosure uniformly and does not lead to cold spots which could cause water vapor condensation. Wherever possible, the space within the enclosure body should be filled with not substantially less catalysts than can be achieved by loosely packing them into the available space. This packing factor should not leave more than an empty volume of about 30% above the highest point reached by any catalyst in the enclosure body when loosely packed in the enclosure body. Preferably, however, the enclosure body should be so designed that no substantial free volume remains above an at least loosely packed catalyst bed. Alternatively, the catalysts can be packed less densely if they are reasonably evenly distributed within a hydrophobic spacer material, such as used in commercially available recombination devices. The spacer materials may be hydrophobic powder or fibers or water proofed powders or fibers of any suitable kind. We have determined that by reacting hydrogen and oxygen gas on catalyst surfaces within an enclosure body of relatively small volume, it becomes possible to set up a controlled thermal gradient in which temperatures in a relatively small volume within the enclosure body resulting from the exothermic reaction between hydrogen and oxygen are constantly at levels higher than temperatures in the battery space occurring outside the enclosure body.

There may thus be realized a "thermal drive" which functions to prevent condensation of water vapor within the enclosure body so that the water vapor seeks to pass through gas outlets of a capillary size in the enclosure body to condense at surfaces which are at the lower end of the temperature gradient. Water outside of the enclosure body, whether as water vapor or water condensed on the surfaces forming the space above the electrolyte and around the enclosure body is returned to the electrolyte by virtue of the desiccant nature of the electrolyte or lowering of the water vapor pressure above it or in the case of condensed water also by gravity when the battery is in an upright position.

The nature of the invention and its other objects and novel features will be more fully understood and appreciated from the following description of preferred embodiments of the invention selected for purposes of illustration and shown in the accompanying drawings, in which:

FIG. 1 is a diagrammatic view illustrating a battery system which may be operated and periodically recharged in accordance with the recombination method of the invention;

FIG. 2 is a plan view of a battery of the general type indicated in FIG. 1;

FIG. 3 is a side elevational view of the battery with portions broken away to illustrate a catalyst recombining means in the battery;

FIG. 4 is a vertical cross-sectional view of the battery shown in FIGS. 2 and 3;

FIGS. 6, 7 and 8 are detail views illustrating diagrammatically one form of catalytic device used in the battery shown in FIGS. 1–5;

FIGS. 9–17 illustrate three other forms of catalytic devices of the invention.

Figure 5:
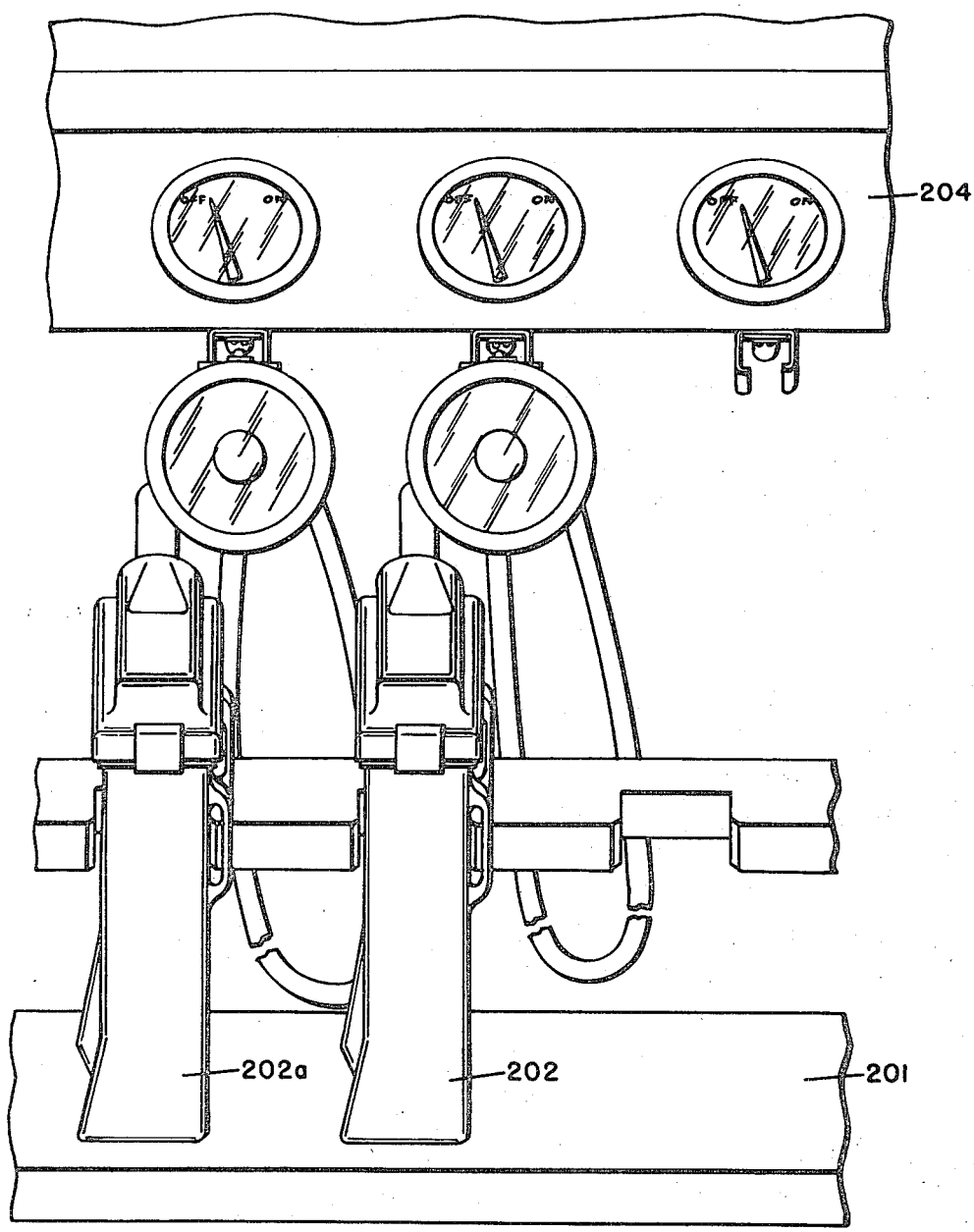
FIG. 5 is an elevational view illustrating fragmentarily a battery charging apparatus with which a battery may be recharged.

Our improved method, in general, therefore, includes evolving and confining hydrogen and oxygen gases in a closed gas space of a secondary battery in the presence of a catalytic device in which catalyst surfaces are protectively contained in an enclosure body and maintained in a suitably reactive state for desired operating periods. The closed gas space for confining the evolved gases and the catalytic device refers to the gas space commonly provided above the electrolyte in secondary batteries which is vented to the outside. In a sealed battery this gas space is hermetically sealed, even though a release valve may be provided to allow venting above predetermined pressure levels. The enclosure body is made with gas inlets comprised by a hydrophobic material which positively repels aqueous electrolyte mist or spray. The hydrophobic material present in the enclosure body is characterized by a selective gas permeability such that when the enclosure body is supported in the closed gas space of the battery, hydrogen and oxygen gases evolved therein may, in response to partial gas pressures developing, be continuously moved inwardly through the enclosure body into contact with the catalyst surfaces.

The hydrophobic portions of the enclosure body are also made with a pore structure which permits water vapor to travel outwardly. The volume of the enclosure body is made as small as possible so that the heat of exothermic reaction resulting from recombination of hydrogen and oxygen gases on the catalyst surfaces within the enclosure body sets up a thermal gradient within safe operating temperatures and produces a substantial "thermal drive" capable of causing water vapor to be continuously travelled outwardly through the enclosure. We have found, for example, that temperatures of 5° and even as low as 1° above ambient temperature in a battery space is sufficient to provide this thermal drive.

Temperatures generated at the catalyst surfaces as a result of exothermic heating are continuously controlled in accordance with the temperature resistance of the hydrophobic catalyst enclosure body in order to prevent change in the hydrophobicity and permeability of the material from which the enclosure body is formed.

We have determined that the desired selective characteristics can be realized by proper combination of hydrophobicity, gas permeability, size distribution, and structure of the inlets or pores for exclusion of mist. These properties, for example, can be designed into hydrophobic materials, such as the preferred fluorinated hydrocarbon polymers as based on tetrafluoroethylene, fluoroethylenes or fluorinated propylene copolymers, during fabrication steps, such as by proper sintering of powders or fibers or by perforating intrinsically non-porous shapes. The materials may be fabricated into rigid bodies of any shape, such as tubular bodies, or in the form of flexible shapes such as membranes and tapes. For non-porous portions of enclosure bodies, where such are desired, non-porous materials of such hydrophobic materials can be fabricated as well in the form of rigid bodies or flexible sheets or tapes. Usually, however, such non-porous portions will be used as rigid supporting structures unless they are used as protective liners, etc., for materials which are not intrinsically hydrophobic.

As noted above, we have found that we may control selective gas transfer by regulating permeability as well as hydrophobic nature in a catalyst enclosure body, and as one specific instance, there may be cited a catalytic device of satisfactory nature in which catalyst means is enclosed by a thin membrane of a fluorinated hydrocarbon polymer such as tape made from Teflon. Teflon is a registered trademark by the E. I. du Pont de Nemours Company for such materials and is manufactured and sold by it. In this connection, we found the tape may have a thickness of approximately .001 to .003 inches and may have a controlled permeability characteristic which is capable of transferring stoichiometric hydrogen and oxygen gas mixtures equivalent to the gas generated by electrolyte water at about 5–30 amps per square centimeter of exposed tape surface.

It will be understood that the above example is not to be taken as limiting the invention thereto. For example, we have also used such fluorocarbon-based, porous, hydrophobic materials such as Teflon as are made for filter purposes having a regulated permeability characteristic equivalent to about 50 to 70 amps per square centimeter and in thicknesses up to .050 inches. Preferred results form the standpoint of electrolyte protection as a matter of fact may be realized with these membranes occurring in the higher range of thicknesses noted.

In addition to the fluorinated hydrocarbon polymers indicated, certain other hydrophobic materials having suitably regulated permeability characteristics may be comprised by compounds such as silicone polymers, fluorinated vinyl chlorides, polypropylene, high temperature nylon, and others. It is also possible we find to use non-hydrophobic and non-electrolyte resistant materials and coat them with hydrophobic substances to combine suitable permeability with satisfactory electrolyte resisting characteristics. Thus such materials can be used if coated with a hydrophobic material such as a fluorinated hydrocarbon polymer dispensed from pressure dispensers. We may thus convert relatively inexpensive hydrophilic porous bodies or membranes into a satisfactory catalytic enclosure body with an external hydrophobic surface.

As one specific example, there may be cited the use of porous high silica glass tubes where such materials are used for water vapor transfer which are rendered hydrophobic by coatings on one or both surfaces. We also find that certain other plastics are sufficiently hydrophobic for rejecting electrolyte mist, but their use is limited because of their lesser chemical and temperature resistance. Use of these compounds is limited as they become increasing wettable when attacked by strong acids or alkalis.

While the term hydrophobic is generally well understood, it might be stated that a substance is considered hydrophobic if its surface tension is significantly less than that of water or 32 dynes/cm. A more useful definition for those skilled in the art, particularly in determining whether a substance is hydrophobic with respect to any given electrolyte, is the contact angle of a drop of electrolyte placed on the surface of a material to be evaluated for hydrophobicity. If the drop tends to spread, i.e. the contact angle is greater than 90° the material can be considered as wetting or hydrophilic. Conversely, if the contact angle is less than 90° the material evaluated is hydrophobic with respect to the electrolyte. Particularly important is the fact that materials which are not resistant to the chemical and/or temperature environment in a battery recombination device may change their properties with time and this is why fluorinated hydrocarbon polymers, because of their known history of temperature and chemical resistance, are generally preferred.

It will be understood that an essential feature of the catalytic device of the invention using any of the materials noted above is that all gas inlets, that is, openings whether macropores or holes or micropores, be substantially comprised by hydrophobic materials at least on the outside of the enclosure body, that is where the catalytic device faces the gas space or spaces from which it receives the reactable gases, i.e., hydrogen and oxygen, by partial pressure equalization forces, whether aided by diffusion or convection. Dependent on the specific use and particularly on the severity of expected electrolyte spray, other portions of the enclosure body may be different in nature.

In addition, water vapor removal may be effected in part through materials which are hydrophilic in nature and have a hydrophilic outside. Effecting at least partial water vapor transfer by means of such hydrophilic materials may be of advantage in situations where there is only a small thermal drive such as at or after the end of gassing on charge when only small residual amounts of water vapor are generated by the catalysts. The hydrophilic portions in the enclosure body then will preferentially absorb the water vapor from where it will be either slowly transferred due to concentration equalization with the electrolyte by vapor transfer and/or will be stored until thermally driven off at subsequent more active recombination cycles.

Such hydrophilic materials may or may not be gas permeable, at any rate, their gas permeability tends to decrease the more water they absorb, and particularly when wetted by electrolyte spray even highly and relatively large pored porous hydrophilic materials may become completely gas impermeable. However, if such hydrophilic materials have sufficient porosity and a suitable pore structure to both allow gas flow in and water vapor flow out, they can be used as a total body enclosure provided the outside thereof is enveloped by a hydrophobic material substantially excluding electrolyte spray and they are sufficiently gas permeable to provide sufficient gas inlets and water vapor outlets.

It is pointed out that the invention may be practised with various modifications as determined by specific design needs and by following the selective gas transferral technique herein described. Thus gas inlets and vapor outlets may be provided by holes in a hydrophobic enclosure body structure (which is quite satisfactory in uses characterized by little electrolyte spray or in batteries which are trickle charged as a rule), or the entire structure may be porous, preferably microporous in nature for complete exclusion of spray even under severe conditions (such as in batteries which need to be rapidly and/or deep charged). Alternatively, a hydrophilic portion, primarily for outwards water vapor transfer, may have hydrophobic caps with gas inlets. Hydrophilic portions may be protected with hydrophobic gas permeable material on the outside and/or inside, etc. Finally, if the body enclosure contains extensive gas impermeable portions on the inside, these portions must be of hydrophobic material to minimize nucleation of water vapor to form liquid water.

We have further found, and this forms part of our invention, that for battery uses which may encounter situations unfavorable to producing a reliable thermal drive, it may be advantageous to supply low level heat to the interior of the enclosure body. As noted above temperatures of 5° and even as low as 1° above ambient sufficient to provide this thermal drive and a range of up to 50° above ambient is acceptable. The generation of such temperatures needs only low power inputs and may be accomplished by means such as, for example, electrical heating means and is not associated with hazards which can be encountered with heaters used to evaporate water once it is condensed.

In carrying out our improved method of recombining gases such as hydrogen and oxygen utilizing a catalytic device of the form noted above, we may desire to utilize the catalytic device with any type of battery or battery operation wherein recombination of gases is desired. However, without limitation, there is noted below illustrative conditions present in a typical miner's lamp battery or in a modified sealed version thereof, which is subject to extended charging operations in the course of which appreciable amounts of gases are produced.

For example, one very common miner's lamp battery has a nominal rating of 4 volts resulting from two cells in series. It has an ampere-hour rating of 12 at a 10 hour discharge rate, one tubular type positive plate and two pasted negative plates per cell, and electrolyte-absorbing separators which, with the plates, contain all but about 20 ml. of the 170 ml. of electrolyte in each cell.

A gas space of approximately 75 ml. is provided above the plates in each cell and temperatures may range from 10° C. to 38° C. Such a battery typically is discharged daily for 10 hours through a lamp with rating of 1.0 ampere at 4.0 volts and is charged for 14 hours daily by means of a charger with output of 4.4 volts and 1.2 amperes at the beginning of charge and 5.1 volts and .90 amperes at the end of charge. For example, one very common miner's lamp battery has a nominal rating of 4 volts resulting from two cells in series. It has a 12 ampere-hour rating at a 10 hour discharge rate, one tubular type positive plate and two pasted negative plates per cell, and electrolyte-absorbing separators which, with the plates, contain all but about 20 ml. of the 210 ml. of electrolyte in each cell.

Such a battery typically is discharged daily for 10 hours through a lamp with a rating of 1.0 ampere at 4.0 volts and is charged for 14 hours daily by means of a charger with output of 4.4 volts and 1.2 amperes at the beginning of charge and 5.1 volts and .90 amperes at the end of charge. Normal ambient temperature during discharge is approximately 15° C. and during charge is in a range between 10° C. and 30° C. In this typical operation, hydrogen and oxygen may be evolved in total amounts which are quite variable from cycle to cycle but which average at standard pressure and temperature approximately 700 ml. per cell per charging period and about 5% as much, or 35 ml., during the discharge period. When the typical miner's lamp battery is sealed with an efficient recombination device, gas pressure fluctuations many range between atmospheric (starting condition) and forty p.s.i.g. (average setting of release valve). On the average the amount of water returned is about one-third a milliliter per cycle. Of course, this does not occur within every cycle but may fluctuate from practically no water return in some cycles, with compensating higher returns in others. Loss of water by operation of the release valve due to excessive non-stoichiometric gassing in a few cycles was negligible in most cases and usually less than a few milliliters for a projected 300 cycle life. Recombination was as a rule effected by an excess amount of catalysts such as 5–10 gms. of catalysts having .01 to .5% palladium on porous alumina substrates having surface areas from about one sq. m./g. to 90 sq. m./g. and intrinsically being capable of combining 10–20 ml. per minute of stoichiometric hydrogen-oxygen mixtures.

FIG. 1 illustrates one form of selective gas transferral system of the invention including a miner's lamp battery of the class above-described, a typical miner's lamp and a battery charging apparatus. As shown therein, numeral 206 denotes the miner's lamp together with a sealed secondary miner's lamp battery 202 of the lead-acid type with which the method and means of combining hydrogen and oxygen gas as herein disclosed may be employed. One form of catalytic device of the invention is illustrated diagrammatically within the battery 202 and is indicated by arrow E. Numeral 204 refers to a conventional battery charging apparatus, having a battery charging rack, of the class commonly utilized by miners in placing a battery on charge at the end of the working day. The battery 202 is illustrated in further detail in FIGS. 2–4, inclusive, and details of the charger 204 and charging rack 201 are shown in FIG. 5.

It will be understood that the battery 202 is placed in use by a miner as he uses his miner's lamp and discharge takes place. At the end of a working day the miner places the lamp on charge in the charging rack 201 as shown in FIG. 5. This cycle is repeated over a desired working life of the battery. Hydrogen and oxygen gas evolved during these battery operations collect in the closed spaces A and B of the battery and move into contact with the catalyst device E under varying pressures as earlier described.

In the apparatus indicated in FIG. 1, means are provided for illustrating the battery on discharge and for charging from a battery discharge operation to a battery charging operation in one simple way. For example, in placing the battery 202 on discharge, a circuit from the positive side of the battery 202 is completed through a lamp 206 and back to the negative side of the battery by moving the double throw switch poles 208 and 210 into contact with switch contacts 212a and 214a, respectively. Current is then generated in the battery in the usual manner and energizes the lamp 206. Such a battery discharge operation is intended to be representative of daily use of the battery by a miner.

When the battery is to be recharged the battery is connected to charger 204. Switch poles 208 and 210 are then moved into contact with battery charging switch contacts 212 and 214. This disconnects the lamp 206 and completes a circuit from the charger 204 through the battery 202 and charging then takes place. Such a battery charging operation is intended to be representative of a miner placing battery 202 in a charging rack 201 as suggested in FIG. 5. The battery during its charging operation evolves gases which are confined in the sealed battery 202 in one or more closed spaces and exert fluctuating pressures. Pressures thus exerted may act through a transducer 218 and when desired may provide signals for actuating an electrical recording system 220 as indicated at the lower right-hand side of FIG. 1, where arrangements for monitoring voltage and ampere during charge and discharge are also indicated.

Further details of battery 202 are shown in FIGS. 2–4 and as indicated therein, the battery is made with a body portion having suitable strength characteristics and further provided with a sealed top 202a. In this body portion is a battery partition 230 which divides the battery into two cells.

Assuming that the battery 202 is illustrative of the 4-volt miner's battery earlier described, the battery casing or body portion is constructed of a material having a strength which will withstand a predetermined range of pressures exterted in the 75 ml. gas space of each cell of the battery. For example, we may employ a polycarbonate plastic to provide the necessary strength. Polycarbonate plastics may be described as polymeric combinations of bi-functional phenols or bisphenols, linked together with a carbonate linkage.

In utilizing a plastic material such as polycarbonate we have, for example, determined that the miner's lamp battery 202 may be constructed to contain a range of pressures extending from 0 pressure all the way up to as high as 75–80 p.s.i.g. or higher. In addition, the overall size of the battery is regulated in accordance with the specific plate construction and quantity of electrolyte employed.

Contained in the cells referred to are positive plates 232, separator members 234, negative plates 236, electrolyte 238 and insulator means 240. The electrolyte is employed in an amount such as 210 mls. to provide a liquid level which covers the tops of the plates. Immediately above the electrolyte are spaces A and B providing the specified volume of 150 mls. in each cell in which gases evolved in the operation of the battery may be sealably contained. Conventional electrical conductor cables and terminals are provided as shown in FIG. 3. Ambient temperatures in the spaces A and B may range from 10° C. to 30° C or higher during the charging period and may be about 15° C. during the usual discharge period.

While it is contemplated that for certain battery systems it may be desirable to provide a completely sealed gas space, it is preferable to employ a pressure relief valve which may be regulated in accordance with a predictable range of pressure fluctuations to provide for confining gas within predetermined releasable limits. The limits referred to are intended to fall below the maximum pressure-retaining capabilities of the battery and may, for example, be of from 30 p.s.i.g. to 70 p.s.i.g. A relief valve V, suitable for this purpose, may be mounted in the battery top in a position to communicate with the gas space as shown in FIG. 3.

In carrying out our method, we recombine gases in battery 202 by means of the catalytic device E which may be supported in the battery above electrolyte 238 on the partition wall 230 as shown in more detail in FIGS. 2–4 inclusive. The catalytic device also includes, as a principal component, a hydrophobic enclosure body 235 which is shown in more detail in FIGS. 6–8 inclusive.

As shown in FIGS. 2–4 inclusive, on top of partition wall 230 there is located a perforated tray 231 formed with perforations 233. The cylindrical enclosure body 235 is shown resting on a fiber glass mat 237. Since the enclosure body is cylindrical in shape, it will be seen that it has only a small area in contact with fiber glass mat 237 and reactable gases thus have free access to the circular sides of the enclosure body 235. Any water condensed near enclosure body 235 can drain through fiber glass mat 237 while on the other hand, this mat protects the enclosure body 235 from direct contact with electrolyte spray emanating from electrolyte 238 directly beneath it.

In accordance with the invention, we provided in the catalytic device E, a hydrophobic enclosure body 235 which includes a cylindrical member closed at either end by circular walls or caps C1 and C2. The cylindrical member as illustrated in FIGS. 6 to 8 inclusive, is formed of a relatively thick non-porous layer of a hydrophobic material such as Teflon of the type earlier described, while the caps C1 and C2 are formed of relatively thin portions of the Teflon membrane.

The caps C1 and C2 are designed to have a degree of gas permeability which will, in response to partial gas pressures in the battery, provide for hydrogen and oxygen gases evolved in the battery spaces A and B (FIG. 2) moving into the space within the cylindrical member.

Furthermore in accordance with the invention, we provide within the enclosure member a plurality of catalyst pellets, P1, P2, P3, etc. of controlled recombination capability. The pellets are preferably arranged in a bed or mass, being loosely piled upon one another as shown in FIGS. 6–8. Each of the pellets P1, P2, P3, etc. includes a substrate material such as alumina in which a catalyst metal such as palladium is impregnated or coated. The recombination capability of each of the pellets is regulated in accordance with the quantity of gases evolved in battery 202 which are required to be recombined, and also in accordance with the temperature resistance of the hydrophobic material Teflon of which the enclosure body 235 is formed.

As an example of catalyst specifications suitable for controlling catalyst temperatures and safely recombining gases evolved in the closed gas space of the miner's lamp battery 202, there may be employed for enclosure body 235 a cylindrically shaped member having a length of 1 inch and ¾ inches defining an enclosure space of about .75 cubic inches. In this space, there may be contained 10 grams of the catalyst pellets P1, P2, P3, etc. The enclosure body, having a volume of only 2 to 3 cubic centimeters, thus comprises a relatively small volume in relation to the 150 millimeter volume comprised by the enclosed battery spaces A and B.

Each of the catalyst pellets P1, P2, P3, etc. were formed from a foraminous substrate of alumina in which was provided a predetermined quantity of palladium impregnated or coated on each pellet to provide a concentration of, for example, .1% per weight of palladium on an alumina substrate having internal surface area of about .3 sq. m./g.

As noted above in a typical daily use of the battery 202, hydrogen and oxygen may be evolved at a rate of 700 ml. and may exert a combined pressure in the battery spaces A and B of from 0 p.s.i.g. to 40 p.s.i.g. In accordance with the invention, the hydrogen and oxygen gases thus evolved in the spaces A and B of battery 202 in response to partial gas pressure equalization forces, moved inwardly through the hydrophobic portions of the caps C1 and C2 into contact with the surfaces of the pellets P1, P2, P3, etc. These catalyst surfaces recombined hydrogen and oxygen gases as a continuous exothermic reaction in the enclosure body 235 to form water vapor. The temperature induced by the exothermic reaction was found to produce a rise in temperature within member 235 of, for example, 40° C. and this rise in temperature provided a positive thermal gradient between temperatures within the enclosure body 235 and temperatures in the spaces A and B outside this enclosure body occurring at ambient temperatures. As earlier noted a typical thermal gradient may be comprised by a temperature of 40° C. and a temperature of 18° C. in the spaces A and B. The rate at which recombination proceeded was controlled per unit surface of the catalyst in accordance with the invention by regulating the gas recombination capability of the catalyst surfaces as noted above so that temperature resulting from exothermic heating could not exceed upper limits at which the enclosure body 235 could be used without change in permeability or hydrophobic character, and specifically the gas recombining capability was so limited that even under the most adverse conditions rise in temperature could be held within a range of from 200° C. to 250° C.

Water vapor resulting from recombination of the gases by reason of the controlled thermal gradient described was prevented from condensing on the inside of the member 235, and in response to the thermal drive described moved through the caps C1 and C2 which provided, due to their porous structure, both water vapor outlets as well as gas inlets. Water vapor transferred through the caps C1 and C2 was returned thereto directly or indirectly as described above. The performance of a battery 202 illustrated in the figure was in the range described for a sealed modification of a miner's battery described above.

At the end of the operating period noted, it was found that no water accumulated within the enclosure body and the quantity of electrolyte remained substantially unchanged, thus clearly establishing the fact that positive return of water vapor from the enclosure body to the electrolyte was continuously carried out in an improved and safe manner.

From the above description of a typical miner's lamp battery in operation, it will be seen that the selective gas transferral method of the invention involves moving gases into a gas permeable hydrophobic enclosure body which repels electrolyte material and which in response to an induced thermal drive constantly returns water vapor to an electrolyte body. Concurrently, the temperature of catalyst surfaces in the enclosure body are controlled in accordance with the temperature resistance of the enclosure body so that a limited degree of exothermic heating may be utilized to return the water vapor to the electrolyte while preserving the hydrophobicity and permeability of the enclosure body substantially unchanged.

As noted in the miner's lamp battery above described, one desirable way of controlling catalyst temperatures, we find, may be realized by limiting the intrinsic gas recombining capability of the catalyst surfaces within both upper and lower limits which are consistent with battery gassing conditions and which prevent a temperature rise to values at which the hydrophobic enclosure body starts to lose its hydrophobicity and/or gas permeability.

In this connection, we have determined that we may also desirably control exothermic heating in our catalytic device in several other ways to preserve the efficiency of our hydrophobic gas inlets and water vapor outlets and to maintain the catalyst surfaces in a properly reactive state. Thus we may control the flow of hydrogen and oxygen gases moving into contact with the catalyst surfaces through single small openings of the gas permeable portion of the enclosure body 235. Further, we may regulate the dissipation of diffusion of heat away from the catalyst surfaces by utilizing, for example, high heat dissipating substrates in which a catalyst metal is impregnated or coated in other ways.

It will be observed that by reason of the fact that our selective gas transferral technique is based upon the use of a gas permeable enclosure body, we are enabled to prevent sudden onrush of gases and to keep a flow of gases moving into contact with the catalyst surfaces at a relatively uniform rate and within predetermined limits which are capable of being adjusted to a necessary, but known, intrinsic gas recombining capability of catalyst surfaces employed.

It is a further desirable feature of our gas transferral technique that we may control the permeability of the enclosure body 235 in relation to the contained catalytic surfaces of the pellets P1, P2, P3 so that they co-act or co-operate with one another to maintain a predetermined rate of recombination which will keep temperatures at the catalyst surfaces within acceptable limits, and particularly below temperatures at which the enclosure body may be physically or chemically changed, i.e. above 250° C. for any substantial length of operating time.

It is pointed out that the disclosed composition of the enclosure body 235, and the specific palladium pellets P1, P2, P3, etc., noted are intended to be illustrative of controlling permeability of the enclosure body in relation to the intrinsic recombination capacity of the catalytic surfaces contained therein so as to provide for recombination of gases with exothermic heating being held within safe operating temperatures, and specifically, below temperatures of 250° C. and higher.

Regulating exothermic heating by controlling intrinsic recombining capability of a catalyst may be carried out in various other ways as disclosed, for example, in considerable detail in application Ser. No. 866,633, "Improvements in Construction and Operation of Rechargeable Battery Systems of Chemically Generating and Electrical Currents" and Ser. No. 866,531, "Methods and Means of Recombining Hydrogen and Oxygen in a Sealed Battery and Controlling Recombination at Catalyst Surfaces," and it is intended that any of the various forms of catalysts described in application Ser. No. 866,633 and Ser. No. 866,531 as well as the methods of preparing such catalysts may be employed in carrying out the method of the present invention.

Thus control of temperature by limiting intrinsic recombination capability of a catalyst may be more fully understood from a consideration of a number of factors to be taken into account and which are reviewed in application Ser. No. 866,633.

As noted therein, it has been recognized that recombination of hydrogen and oxygen by means of a catalyst is an exothermic reaction which accelerates with the rate of gassing and/or partial pressures of stoichiometric hydrogen and oxygen to raise the temperature of the catalyst. It has also been assumed that oxygen and hydrogen are first absorbed at the catalyst surface where they react to form water in the condensed form which then evaporates. An example of a catalytic site is amorphous palladium metal on a catalyst support such as porous alumina. Dependent on the heat dissipation properties of the catalyst and of the surrounding enclosure body, the temperature and nature of the environment, including importantly the pressure, etc., the heat generated by the exothermic reaction may thus more or less raise the temperature of the catalytic surface to thereby raise its activity and generate more heat. If there is an ample and rapid supply of oxygen and hydrogen, this can cause a runaway process which will lead to a thermally or free radical initiated ignition in the gas space with temperatures rapidly increasing to above 600° C. where combustion or explosion can take place.

As set forth in application Ser. No. 866,633, it has been determined that a recombination device can provide complete recombination of hydrogen and oxygen in a battery at a satisfactorily rapid rate but within predetermined limits of temperature by controlling the reaction rate per unit of area of catalyst exposed to a free gas space in such a manner that within the design parameters of such a battery with respect to gas composition, pressure and ambient temperatures, the temperature as measured at catalyst surfaces will not reach a value at which combustion or explosion preceeds into the gas space under the most adverse conditions, and may, in fact, be held substantially lower within upper limits of from 400° C. to 600° C. and preferably below 250° C. or less.

In application Ser. No. 866,633, it is disclosed that this may be done by adjusting the palladium content of a catalyst and surface area of the catalyst in convective and/or radiant and conductive contact with a surrounding battery structure and catalyst surfaces were observed to be reduced in temperature from 600° C. down to approximately 250° C., and as illustrative of this control application Ser. No. 866,633 disclosed a catalyst device in the form of a small cylindrical foraminous pellet having diameter of 1.6 mm. and an axial length of 3.8 mm. and having internal surface area of about 90 square meters per gram, and a palladium content of about .54% by weight. This catalyst reached a temperature of 600° C. when subjected to a gassing rate of 2 to 3 amps, i.e. about 1.35 to 1.50 liters of stoichiometric gas. The same test procedure was carried out with the catalyst device changed to provide a lower palladium content. The cylindrical foraminous pellet was made with a diameter of 4/16 of an inch and a length of 6/16 of an inch and the palladium content was .01% by weight on a surface area less than 1 square meter per gram. This device when exposed to gases showed temperatures reduced to 200° C. and lower.

In application Ser. No. 866,531 there has been disclosed a composite catalytic device which we may desire to employ in our present invention and attention is again directed to details of the disclosure in Ser. No. 866,531 for a discussion of specific forms and use of these composite catalysts. As disclosed in Ser. No. 866,531 the composite catalysts are comprised by a nucleus of catalytic material of relatively high level gas recombination capability which can control recombination of gases in a very positive manner and provide cumulative heating for an outer surrounding body of catalytic material of low-level activity.

In practice such composite catalysts are most easily realized by either one of two approaches. In the first approach a bed of catalysts having less than .1% palladium by weight, preferably on a porous alumina substrate having not more than 1 sq. m./g. surface area, will provide a thermally favorable condition in the nucleus or center of the bed, thus permitting easy start up. Due to the low level impregnation and low surface area such a bed prevents over heating. In the second approach an individual composite catalyst may be prepared by having a highly active catalyst (such as more than .2% palladium by weight on porous alumina having more than 10 sq. m./g. surface area) may be enclosed by a low activity shell of the properties described for the bed above. Palladium impregnated alumina substrates are generally preferred for oxygen-hydrogen recombination. However, if desired, equivalent catalyst materials using e.g. other noble metals, such as platinum, rhodium, or iridium and other substrates, such as other refractories like magnesia, zirconia, charcoal, graphite, silicon carbide, etc. may be employed.

It has also been disclosed in application Ser. No. 886,531 that when utilizing a composite catalytic, a self-limiting temperature effect may be realized in a battery when hydrogen and oxygen pressures increase. At such time, there is caused to take place heat release from outer catalytic surface of the composite catalyst and in increasing degree by means such as radiation, conduction and convection until the heat release equals or exceeds exothermically induced heat in the exposed catalyst surfaces and then temperature ceases to rise.

While temperature control by catalysts of this kind and by other means have been described in these copending applications, which are included herein by reference, it is important to understand that one modification of our invention as disclosed herein is based on our discovery that the use of such controlled catalysts in combination with enclosure bodies having hydrophobic portions providing gas inlets as well as at least partial gas outlets leads to superior catalytic devices and to unexpected results. The combination of such catalysts with such enclosure bodies provides, for example, (a) superior start-up for low level catalysts beyond that achieved in these copending applications due to the virtual elimination of mist without (b) endangering the properties of the hydrophobic enclosure body due to the temperature controlled catalysts and (c) enhancement of the thermal environment for the start-up in the nucleus which in turn enhances vapor transfer through a hydrophobic material, thus minimizing water condensation on the catalysts proper.

In accordance with our present invention the hydrophobic gas inlets of the enclosure body can be utilized to provide for flow limitations of the reactable gases and thus we can in another way control the temperature of the catalysts. Thus the single small openings having about a 3 mm. ID and 8 mm. length in the Examples 1 through 4 or the membranes as used in Examples 5 and 6 and as described previously in this specification provide sufficient flow restriction to provide the desired temperature control. However, we prefer for overall safety reasons, to use catalysts which are intrinsically temperature limited as described above.

It is intended that catalytic devices such as these may be employed in the present invention in either the form shown in the device in FIGS. 1–8 or in various other devices such as those illustrated in FIGS. 9–20, inclusive.

In addition to the form of catalytic device shown in FIGS. 1–8 we may also desire to employ various other modified forms of catalytic devices. Thus in FIGS. 9–11, inclusive, there is illustrated another form of catalytic device of the invention in which a bed of pellets P6 is contained within a tubular enclosure body F1, formed with perforations G. This tubular enclosure body is closed at opposite ends by perforated end portions C3 and C4. The perforated enclosure F1 together with end portions C3 and C4 are comprised by a hydrophobic material of the class referred to above, and consisting of Teflon, for example, these parts are preferably constructed of a thickness suitable to support a retaining structure for the pellets and located around these parts is a continuous relatively thin membrane M of hydrophobic material such as Teflon.

This arrangement is preferred where it is desirable to have the entire enclosure body surrounded by a membrane with the perforated portions F1, C3 and C4 serving as support for the membrane. Evidently this arrangement allows access of gases as well as removal of water vapor from all sides and will be particularly suitable for enclosure bodies of an elongated cross-section to facilitate access to gases and removal of water vapor.

In FIGS. 12 to 14, inclusive, another form of catalytic device is illustrated which includes a bed of catalytic pellets P7 contained within an enclosure body which may again be of tubular shape. The tubular portion F2 is comprised by a porous hydrophilic material which is water receptive and through which water vapor may be readily pass.

Suitable materials are hydrophilic fine porous ceramics. Particularly suitable are materials which have a small to negligible gas permeability and which transfer water by condensation in the pores preferably less than about 100 Angstrom in diameter. One such material is known as "porous Vycor," a registered trade name for the precursor material to "Vycor" (registered trade name by Corning Glass Works who manufactures and sells such materials) which is used as a high silica laboratory glassware material. This material is based on the property of certain borosilicate glasses to separate into two intertwining phases on heat treatment, one of them being rich in boric acid and the other in silica. The boric acid phase then can be leached out and a fine porous high silica (over 90%) glass with pores about 35% pore volume) of around 20 to 40 Angstrom is formed. This material is extremely hydrophilic and has a low gas permeability. However, water vapor condenses in the capillaries and is rapidly transferred through the pores. Another material approaching the above material is made by forming a network of silica gel in a plastic matrix. While considerably more gas permeable, it becomes rapidly gas impermeable after water is adsorbed. Coarser porous hydrophilic ceramic materials can be also used, but are less effective in rapidly absorbing water.

Located about the hydrophilic tubular body F2 is a thin membrane M1 which extends around opposite ends of the tubular member so as to completely cover this member. The membrane may be of a hydrophobic material such as Teflon as earlier noted.

In this arrangement of catalytic components, a mechanism of hydrophobic gas inlets and water vapor outlets is also provided by the parts noted. Thus the porosity of the membrane M2, at opposite ends of the tubular enclosure, allows hydrogen and oxygen gases to enter into contact with the catalyst pellets P7. Substantial portions of water vapor, formed at the catalyst surfaces, will diffuse toward the hydrophilic surfaces of the hydrophilic component F2, and the water receptive nature of this substance provides for rapid absorption of the water vapor which is thereafter moved outwardly through the membrane M2 to condense outside of the enclosure body.

In FIGS. 15–17, inclusive, there is illustrated a tubular structure somewhat similar to that shown in FIGS. 12–14, with the difference that a tubular body F3, enclosing catalyst pellets P8, is made from "Vycor" or similar hydrophilic material and not protected by a hydrophobic membrane. Ends of the tubular structure F3 are closed by caps C5 and C6. Such a device can be used where electrolyte spray is at a minimum and/or good baffles can protect the device sufficiently. Otherwise the operation is the same as that of the device described in FIGS. 12–14.

Figure 18:
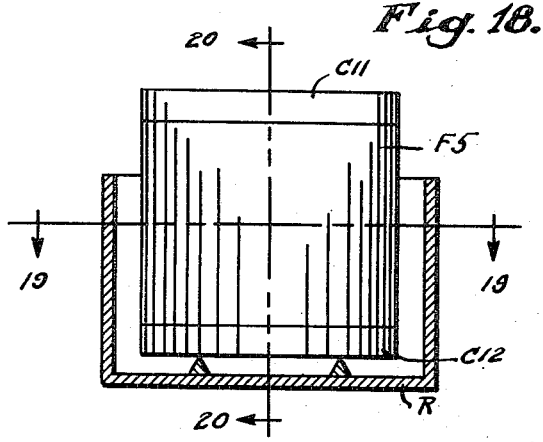
Figure 19:
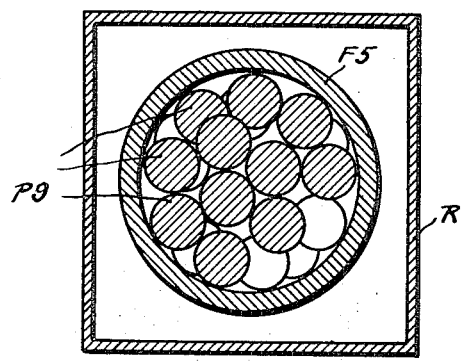
Figure 20:
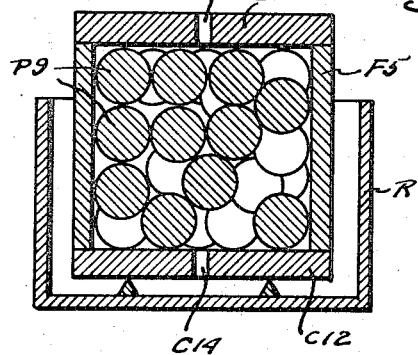

FIGS. 18–20 inclusive, illustrate one of the simplest ways of constructing a device according to our invention, which, however, is perfectly operative when acid spray or other electrolyte mist problems are minimal. There is again shown a bed of pellets 9 within a tubular body of hydrophilic material such as porous "Vycor" F5. The ends of the tube are closed off with caps C11, C12 which are made from a hydrophobic material such as a fluorinated hydrocarbon polymer, which has narrow gas inlets C13, C14 which, to minimize any intrusion of liquids, have preferably a small diameter such as 5 mm. or less and a length to height ratio of more than two. Of course, if larger gas access is desired, more openings of this kind can be arranged in either or both of the caps C11, C12. There may also be employed a spray baffle element R supported in some convenient manner at the under side of the device F5 as indicated diagramatically.

From the disclosed operating results noted above in connection with the description of battery 202 (FIGS. 1–8 inclusive), it will be apparent that the selective gas transferral system of the invention has been demonstrated as an effective means of overcoming the problems in preventing accumulation of water on catalytic surfaces and returning water of recombination to the electrolyte.

As further illustration of successful operation of the method of the invention, there are noted below examples of a number of other simulated battery operations utilizing modifications of catalytic devices generally corresponding to those illustrated in FIGS. 9 to 20. These test procedures were carried out in specially devised testing equipment constructed to provide a simulated battery. This equipment consists in a transparent plastic casing capable of being hermetically sealed and containing a volume of sulfuric acid and also having two platinum electrodes used to generate stoichiometric hydrogen and oxygen.

Catalyst devices to be tested were lowered in the casing immediately above the level of the sulfuric acid and the casing was thereafter sealed. Electrolysis was then started and the current held at 1 amp for one-half hour and then at 50 milliamps for another one half hour. Electrolysis was then stopped and the catalyst was removed and inspected for water accumulation and acid contamination.

EXAMPLE A

In order to establish a basis of comparison of the accumulation of water in a catalyst environment, a catalytic device was first tested without the selective gas transfer system of the invention but being the same in all other respects. For this purpose, a catalyst enclosure body having a nonporous hydrophilic portion as a substantial portion of the body was provided. The device had two end closures made from a fluorinated hydrocarbon polymer, of which one had an opening for admitting gas. In this enclosure body were located a bed of catalyst pellets of the type commonly used, such as .5% palladium by weight impregnated about 90 sq. m./g. pellets previously described. At the end of a period of fifty-four minutes, electrolysis was stopped and examination of the catalytic device showed appreciable amounts of condensed water on the glass tube, occurring in amounts which would lead to catalyst failure after a short operating period.

EXAMPLE B

The procedure of Example A was repeated using the same equipment with the exception that the glass tube of Example A was replaced by a porous hydrophilic material consisting of a tube of Vycor of the type earlier disclosed in the specification. The gas inlet hole was provided in a Teflon enclosure. The porous hydrophilic material was found to provide a satisfactory water vapor transfer as evidenced by the fact that no moisture was observed after running the device for several cycles corresponding to the cycles earlier specified.

EXAMPLE C

The procedure of Example B was again repeated with the same equipment except that the Vycor tube was sprayed with sulfuric acid. Condensed water appeared on the inside of the Vycor tube after approximately 60 minutes, i.e., at the end of the first cycle, clearly indicating that the Vycor is not completely resistant to electrolyte spray.

EXAMPLE D

The procedure of Example B was again carried out using the same Vycor tube and other equipment but first applying to the Vycor tube a protective wrapping of a hydrophobic tape such as Teflon. The tape had a gas permeability as earlier disclosed and the device was sprayed with sulfuric acid in the manner carried out in Example C. After three cycles, no water of condensation was perceived on the interior of the Vycor tube, indicating that unlike the device of Example C, the acid electrolyte had been completely excluded.

EXAMPLE E

The devices of Examples A, B, C, and D were found to be unable to fully consume the one-ampere gassing rate specified, and thus showed a continuing pressure rise during operation because of the gas flow restriction caused by the small hole in the Teflon cap. A similar device to that used in Example A, but with Teflon tape wrapped along its length and covering both ends was constructed. This also showed no water of condensation after several cycles and was, in addition, able to consume gas from the one-ampere gassing rate at an equilibrium pressure of 1.3 atmospheres absolute (0.3 atmospheres of stoichiometric gas).

EXAMPLE F

In another test operation, a device was made using hydrophobic membranes for substantially the entire body. The device was of the same dimensions as that of Example A and was made with a body of nylon mesh with the mesh being wrapped completely in Teflon tape. This device also showed no water of condensation on the interior surfaces after a number of cycles, and was easily able to consume a one-ampere gassing rate.

In addition to such simulated battery examples, extensive tests were carried out in sealed batteries of the type described above, that is batteries which were essentially sealed modifications of a miner's battery and having recombination devices incorporated therein. Typical results are illustrated in the following examples.

EXAMPLE G

In this example a recombination device was constructed from a piece of porous Vycor tubing, 2.5 cm. long and 1.8 cm. outside diameter. This tubing was filled with 5 grams of catalyst pellets of the composite type and totally enclosed in a hydrophobic membrane by wrapping Teflon tape over the ends and along the body of the device. This device was then placed into a modified mine lamp battery as noted above and the battery was sealed and placed on a charge/discharge cycle to simulate mine lamp battery operation which consisted of consecutive discharges at about 1 amp for 10 hours followed by a full recharge over 14 hours. The pressure and gas composition were continued, only monitored during each cycle. Recombination of the gas inside the battery was indicated by the relatively low total pressure and the absence of all but a trace of oxygen. This behavior was observed for several cycles and then the battery was left on this continuous cycling regime for a period of six months. At the end of this time, observations were being made on the total pressure and the gas composition inside the battery. The results were essentially the same as observed at the beginning of the period with oxygen only present in trace quantities at the end of the charge cycle showing that the recombination device continued to be fully effective in recombining the hydrogen and oxygen produced primarily during the charge cycle.

EXAMPLE H

In this example a recombination device was made from a piece of a non-porous Teflon tube 1 inch long and 0.75 inches outside diameter. Six grams of catalyst pellets of the type used in Example G were placed in this tube and the two ends covered with a porous Teflon membrane as used for filter purposes and previously described and sealed with epoxy cement. This device was placed into a similarly modified mine lamp battery on a charge/discharge cycle as in Example G. Pressure and the gas composition measurements made as before showed that the recombination device was recombining all of the hydrogen and oxygen produced during the charge cycles. This battery was placed on continuous charge/discharge cycles to simulate mine lamp battery operation for a period of five months. At the end of that time further measurements of the pressure and gas composition showed that the unit continued to be fully capable of recombining all the hydrogen and oxygen gas produced during each charge cycle.

From the foregoing disclosure of our invention it will be apparent that we have provided an improved technique and improved means for recombining gases and releasing water of recombination in the electrolyte body from which it evolved while at all times maintaining the catalyst means substantially free from electrolyte mist and accumulation of water.

We claim:

1. A hydrogen-oxygen recombining device for use in a secondary battery having an electrolyte therein comprising a catalytic mass and an enclosure body having the catalytic mass totally enclosed therewithin, said catalytic mass including a refractory substrate and a predetermined quantity of catalytic material distributed on said substrate, said enclosure body consisting solely of plastic hydrophobic material and having a portion which is gas permeable, said hydrophobic material including said permeable portion preventing liquid and mist from the battery electrolyte from entering said body and contaminating said catalytic mass, said permeable portion permitting the hydrogen and oxygen to enter said body and contact said catalytic mass and said permeable portion permitting water vapor formed by recombining the oxygen and hydrogen to diffuse from said body, said catalytic mass having a catalytic metal content equivalent to a palladium content of not more than .1% by weight of the substrate, said catalytic mass, when inducing an exothermic reaction to recombine the hydrogen and oxygen, being characterized by a limited temperature rise within limits below that temperature at which hydrophobicity and permeability of the enclosure body would be changed.

2. The device as set forth in claim 1 further characterized in that said substrate is alumina.

3. A device according to claim 1 wherein said permeable portion is a flexible fluorinated hydrocarbon material.

4. A device according to claim 1 in which said refractory substrate for the catalytic mass has an internal surface area of not more than 1 square meter per gram.

References Cited

UNITED STATES PATENTS

| | | | |
|---|---|---|---|
| 3,102,059 | 8/1963 | Harmer | 136—181 |
| 3,258,360 | 6/1966 | Kordesch | 136—6 GC |

JOSEPH SCOVRONEK, Primary Examiner

U.S. Cl. X.R.

136—6 GC, 179